United States Patent [19]
Herrig et al.

[11] Patent Number: 5,376,741
[45] Date of Patent: Dec. 27, 1994

[54] PROCESS FOR THE PREPARATION OF POLYCARBONATES

[75] Inventors: Wolfgang Herrig, Bergisch Gladbach; Jürgen Kadelka, Krefeld; Uwe Hucks, Alpen, all of Germany

[73] Assignee: Bayer Aktiengesellschaft, Leverkusen, Germany

[21] Appl. No.: 150,667

[22] Filed: Nov. 10, 1993

[30] Foreign Application Priority Data

Nov. 20, 1992 [DE] Germany .................. 4239131

[51] Int. Cl.$^5$ .................................. C08F 2/00
[52] U.S. Cl. ............................ 526/64; 526/65; 526/67; 528/196
[58] Field of Search ............ 526/64, 65, 67; 528/196

[56] References Cited

U.S. PATENT DOCUMENTS

| | | |
|---|---|---|
| 3,674,740 | 7/1972 | Vernaleken et al. ............ 526/65 |
| 3,787,359 | 1/1974 | Horn et al. |
| 3,945,969 | 3/1976 | Horn et al. .................... 526/64 |
| 4,025,489 | 5/1977 | Bailey et al. |
| 4,122,112 | 10/1978 | Koda et al. .................... 558/268 |
| 4,737,573 | 4/1988 | Silva et al. .................... 528/371 |
| 4,810,813 | 3/1989 | Kosky et al. ................... 558/281 |
| 4,847,352 | 7/1989 | Weston et al. .................. 528/196 |
| 4,959,456 | 9/1990 | Ashida et al. ................... 528/371 |
| 5,037,941 | 8/1991 | Weston et al. .................. 528/196 |
| 5,037,942 | 8/1991 | Hunt et al. .................... 528/198 |
| 5,047,497 | 9/1991 | Tamura et al. ................... 528/199 |
| 5,210,172 | 5/1993 | van Hout et al. ................ 528/196 |
| 5,258,484 | 11/1993 | Schomacker et al. ............. 526/64 |

FOREIGN PATENT DOCUMENTS 306838  3/1989  European Pat. Off.
1409614 10/1975  United Kingdom.

*Primary Examiner*—John Kight, III
*Assistant Examiner*—Terressa Mosley
*Attorney, Agent, or Firm*—Joseph C. Gil; Aron Preis

[57] ABSTRACT

The present invention relates to a process for the preparation of polycarbonates in which an oil-in-water emulsion is maintained throughout by carrying out the reaction under special conditions.

7 Claims, No Drawings

PROCESS FOR THE PREPARATION OF POLYCARBONATES

The present invention relates to a process for the preparation of thermoplastic, aromatic polycarbonates by the method of phase interface condensation from phosgene, diphenols, chain terminators and optionally branching agents by phosgenating an aqueous alkali metal salt solution of the diphenols at pH values of from 8 to 14 in the presence of solvents or solvent mixtures which dissolve aromatic oligocarbonates and aromatic polycarbonates but are immiscible with water, using polycondensation catalysts and two reactors arranged one behind the other, characterised in that a proportion of the aqueous reaction phase obtained after the reaction has been completed is returned to the phosgenating reactor in such a quantity together with the raw materials that an oil-in-water emulsion is formed directly and is maintained in both reactors throughout the reaction time.

In the preparation of polycarbonates by the phase interface process it is important to carry out the reaction under such conditions that good phase separation is achieved. This is a precondition for obtaining high product qualitites.

Thus DOS 2 305 144 describes a process for the continuous preparation of polycarbonates in which the aqueous diphenol solution and phosgene are brought together in a mixing zone in the presence of amines and phosgenation proceeds in the first part of a reaction path. It is only then that solvent is added to complete the reaction in the second part of the reactor. The disadvantage of this process is the large excess of phosgene and the large quantity of aqueous reaction phase which constitutes effluent and must be worked up. The large quantity of aqueous reaction phase promotes the phosgene side reactions.

According to DOS 2 353 939, the properties of a polycarbonate prepared by the diphasic interface process can be improved by controlling the reaction by pH regulation. The disadvantage of this process is the excess of phosgene put into the process; moreover, the process is not continuous.

According to the teaching of EP 0 282 546, condensates containing chloroformyl end groups are produced with a high phosgene yield by the phase interface process if a stable diphenol/water/sodium hydroxide suspension and phosgene are both continuously introduced into an organic phase at the same time and the reaction product is subsequently isolated. The pH is adjusted to values of from 2 to 5 during the reaction. Disadvantages of this process are the technical difficulties in dosing the suspension and the low pH, which considerably increases the time required for phosgenation. Measures for polycondensation are not described.

According to EP 0 434 888, polycarbonates with improved heat stability and improved colours are obtained when the process is carried out in water-in-oil emulsions with specified drop sizes.

According to EP 0 263 432, condensates containing chloroformyl end groups or polycarbonates can be prepared from aqueous diphenolate solution and organic phosgene solution by mixing the phases at pH values of from 8 to 11 and temperatures from 15° to 50° C. and a phosgene excess of at least 10 mol-% and carrying out the phosgenation with concomitant further addition of alkali metal or alkaline earth liquors. Preferred phase ratios are water to oil ratios of from 0.4:1 to 1:1 with further addition of water.

DOS 2 725 967 teaches that it is advantageous for the phosgene yield of a continuous process first to bring the aqueous alkaline diphenol solution together with the organic phosgene solution in a tubular reactor and then to introduce the mixture into a tank type reactor. The residence time in this tube should be from 0.5 to 15 seconds. The process has the disadvantage that phosgenation takes place at unfavourable phase ratios (oil to water=0.2 to 1) in order to ensure separation of the phases after completion of the reaction.

According to EP 0 306 838 A 2, phosgenation is monitored in situ with the aid of an automatic chloride detector. This procedure enables fluctuations in the chemistry of the reaction to be detected and counteracted. The technical properties of the polycarbonates are improved. The basic idea of the process is that diphenolate which has not undergone reaction is returned to the process. One disadvantage, however, lies in the phosgene side reactions, which manifest even when this measure of returning unreacted diphenolate is carried out.

According to EP 0 339 503 A 2, the phosgene side reactions may be increased in particular by the presence of a high initial concentration of sodium hydroxide solution. According to the said Patent Specification, therefore, the diphenol/sodium hydroxide/water solution is brought together with the organic phosgene solution at an alkali:diphenol ratio below 2:1 (subequivalent amount of alkali). Under these conditions, oligomers having molecular weights of from 300 to 3000 g/mol are formed in the first reaction stage. The phase ratios of water to oil are greater than 1; the water consumption is therefore high. Moreover, the phosgene side reactions are still very unfavourable.

According to EP 0 304 691, a fine emulsion obtained by high powered mixing is advantageous for the course of the reaction in a diphasic interface process which, however, is carried out with the introduction of a very large excess of phosgene (20 to 100 mol-%). The large quantity of phosgene introduced ensures good phase separation in spite of intensive mixing of the emulsion at the beginning of the reaction. The phosgene yield, however, is very unfavourable.

According to U.S. Pat. Nos. 4,847,352, 5,037,941 and 5,037,942, the components for the reaction are mixed in static mixers to produce fine aqueous dispersions which subsequently become coarse dispersions. These steps of dispersion and reaction are repeated until the reaction has been completed.

The continuous production of polycarbonate by the phase interface process in many cases requires unfavourable phase ratios, sometimes with a large input of water, because problems of separation and washing after completion of the reaction otherwise occur.

The effect of satisfactory phase separation is achieved by using large quantities of water in the reaction. This, however, is at the expense of the yields from the raw materials and hence also at the expense of the product quality and reproducibility of the properties of the product.

It has now surprisingly been found that the production of polycarbonates by the phase interface process can be carried out particularly economically and with great constancy and reproducibility of the molecular weight and excellent separation of the reaction emulsion if the process is carried out throughout with oil-inwater emulsions having high electrolyte contents in the aqueous phase.

The process according to the invention is characterised in that a proportion of the aqueous reaction phase obtained after completion of the reaction is returned to the phosgenating reactor together with the raw materials, the quantity of aqueous reaction phase returned being calculated to ensure that an oil-in-water emulsion is produced directly and maintained throughout the reaction time. It is surprisingly found that the side reactions discussed in the literature are not promoted by large quantities of aqueous phase with high electrolyte contents. On the contrary, high electrolyte contents suppress the aforesaid side reactions.

The process according to the invention surprisingly leads to permanently reproducible phase separation after completion of the reaction, with only small residues of water in the organic phase. Advantages are also found when the crude polycarbonate solutions are washed free from electrolytes. Reactions with additives are suppressed in the extrusion process. Further, the molecular weights can be kept within narrow limits in the continuous process. It is a further advantage to use high concentrations of aqueous alkali metal salt solutions of diphenols in order to reduce the effective quantity of effluent.

Diphenols which may be used for the production of high molecular weight polycarbonates by the process according to the invention are those which form water-soluble alkali metal salts with alkali metal hydroxides such as sodium or potassium hydroxide. Alkaline earth liquors may also be used. This condition applies to virtually all known diphenols and mixtures thereof.

The diphenols used are preferably those corresponding to the general formula HO—Z—OH in which Z stands for one or more aromatic nuclei which may carry different substituents. The substituents, apart from hydrogen, may be chlorine, bromine or aliphatic or cycloaliphatic radicals. Bridging members, which may contain aliphatic or cycloaliphatic radicals or hetero-atoms, may be present between two aromatic nuclei. The following are examples: Hydroquinone, resorcinol, dihydroxydiphenols, bis-(hydroxyphenyl)-alkanes, bis-(hydroxyphenyl)-cycloalkanes, bis-(hydroxy-phenyl)-sulphides, bis-(hydroxyphenyl)-ethers, bis-(hydroxyphenyl)-ketones, bis-(hydroxyphenyl)-sulphones, bis-(hydroxyphenyl)-sulphoxides, 1,1′-bis-(hydroxyphenyl)-diisopropylbenzenes and derivatives thereof which are alkylated or halogenated in the nucleus.

These and other suitable diphenols are described, for example, in U.S. Pat. Nos. 4,982,014, 3,028,365, 2,999,835, 3,148,172, 3,275,601, 2,991,273, 3,271,367, 3,062,781, 2,970,131 and 2,999,846, in DOS 1 570 703, 2 063 050, 2 063 052 and 2 211 956 and in French Patent Specification No. 1 561 518.

Preferred diphenols are in particular the following: 2,2-Bis-(4-hydroxyphenyl)-propane, 2,2-bis-(3,5-dimethyl-4-hydroxyphenyl)-propane, 1,1-bis-(4-hydroxyphenyl)-cyclohexane and 1,1-bis-(4-hydroxyphenyl)-3,3,5-trimethylcyclohexane.

The types and quantities of chain terminators and optionally branching agents known from the literature may be added to the diphenols. Suitable chain terminators include the known monophenols such as phenol itself, $C_1$–$C_{10}$-alkylphenols such as p-tert.-butylphenol and p-cresol and halogenated phenols such as p-chlorophenyl and 2,4,6-tribromophenol. Phenol, cumylphenol, isooctylphenol and p-tert.-butylphenol are preferred chain terminators.

The branching agents used may be those having three or four or more than four functional groups, in particular those having three or more than three phenolic hydroxyl groups and they should be used in the usual quantities of from 0.05 to 2 mol-%, based on the quantity of incorporated diphenols.

The following are specific examples of suitable branching agents having three or more than three phenolic hydroxyl groups: 2,4-Bis-(4-hydroxyphenyl-isopropyl)-phenol, 2,6-bis-(2′-hydroxy-5′-methyl-benzyl)-4-methylphenol, 2-(4-hydroxyphenyl)-2-(2,4-hydroxyphenyl)-propane and 1,4-bis-(4,4′-dihydroxytriphenyl-methyl)-benzene. Further examples of trifunctional compounds include 2,4-dihydroxybenzoic acid, trimesic acid, cyanuric chloride and 3,3-bis-(4-hydroxyphenyl)-2-oxo-2,3-dihydroxyindole and 3,3-bis-(4-hydroxy-3-methyl-phenyl)-2-oxo-2,3-dihydroindole.

The solvents used may be any which dissolve oligo- and polycarbonates at the selected reaction temperatures and pressures and are themselves substantially immiscible with water (in the sense of solutions). Chlorinated hydrocarbons such as methylene chloride or chlorobenzene are preferably used. These solvents may be used alone or as mixtures of various composition. When chlorobenzene is used alone it is necessary to employ higher operating temperatures for the reaction and for washing in order to obtain technically useful concentrations of polycarbonate in chlorobenzene. Benzene homologues may also be used as solvents. A preferred solvent combination for the technically important polycarbonate based on 2,2-bis-(4-hydroxyphenyl)-propane is a mixture of methylene chloride and toluene, which may be used for all stages of the process. The concentration of polycarbonate in solutions containing the above-mentioned solvents is from 5 to 30%.

Among the many polycondensation catalysts described for the phase interface process, the trialkylamines and N-ethylpyrrolidone, N-ethylpiperidine, N-ethylmorpholine, N-isopropylpiperidine and N-isopropylmorpholine are particularly suitable, especially triethylamine and N-ethylpiperidine.

Suitable reactors are: Loop reactors with heat exchangers, heat controllable stirrer vessels and heat controllable flow tubes of various constructions. Common to all the reactors is that they ensure intensive mixing at every point and at all times. Suitable flow tubes also include those which have residence and mixing zones to provide for the necessary residence times. The principle of such flow tubes is shown in DE-PS 1 920 302 (LeA 12 209) and in U.S. Pat. No. 3,674,740. A wide variety of static mixers nowadays available on the market may also be used for maintaining the emulsion. The preferred combination of two reactors arranged one behind the other as used in the process according to the present invention comprises a pump circulation reactor and a tube reactor with mixing and residence zone (as in DE-PS 1 920 302).

The pH values are from 8 to 14 at all stages of the reaction, preferably from 10 to 13.5. This is achieved by introducing into the pump circulation reactor a proportion of the total quantity of sodium hydroxide solution required and adding the remainder together with the catalyst before entry into the tube reactor.

The average residence times depend on the types of reactor used. Shorter residence times are generally sufficient in flow tubes. The residence times are generally from a few seconds to 30 minutes. Short residence times are advantageous for the first reaction stage; these vary from 10 seconds to 30 minutes, preferably from 10 seconds to 15 minutes. Residence times of from 1 minute to 30 minutes, preferably from 2 to 15 minutes, are chosen for the second reaction stage. The residence times also depend to a large extent on the intensity of mixing in the particular reactor and on the diphenols used.

In one embodiment given by way of example, the process according to the invention is carried out in the two process steps described below, which are characterised in that in the first step, the aqueous alkali metal salt solution of the diphenols together with added monophenols is reacted with phosgene in the presence of organic solvents, the returned aqueous reaction phase and additional alkali metal liquor which is introduced with some time delay, and in the second step, the intermediate product thus obtained is condensed to a polycarbonate in the presence of a polycondensation catalyst and additional sodium hydroxide solution.

For the process according to the invention, the concentration of diphenols in the original, not by aqueous phase diluted aqueous alkali metal salt solution should be from 10% by weight to 40% by weight, preferably from 15% by weight to 30% by weight, based on the aqueous alkali metal salt solution.

It is also suitable for the process according to the invention if the aqueous reaction phase is returned in such a quantity that the concentration of diphenols, based on the total aqueous phase consisting of alkali metal salt solution of the diphenols, alkali metal liquor and returned aqueous reaction phase, is from 2.5 to 15% by weight, preferably from 2.5 to 10% by weight.

In the process according to the invention, the portion of aqueous reaction phase which is to be returned is precooled to such a low temperature and used in such a quantity that the boiling point of the solvent used or of the lowest boiling solvent of a solvent mixture at normal pressure is never reached in either of the two reactors, even without further cooling,so that the process may be carried out at normal pressure.

In a preferred method of carrying out the reaction, the solvents or solvent mixtures used have boiling points which are higher than the temperature which becomes established in the reaction mixture without precooling of the aqueous reaction phase which is returned, so that cooling may generally be omitted. One such solvent is chlorobenzene.

Suitable reactor combinations for the process according to the invention are, either, a combination of flow tube with flow tube for both stages of the reaction or a combination of pump circulation reactor for the first reaction stage with flow tube for the second reaction stage.

A preferred embodiment of the process is carried out as follows: The alkaline aqueous diphenol solution with chain terminator, the returned aqueous reaction phase (always used in such a quantity that an oil-in-water emulsion is maintained throughout), the phosgene with solvent and, with time delay, sodium hydroxide solution to maintain the pH at 8 to 14 are introduced into the emulsion which is circulated through a loop reactor by a pump. When the reaction emulsion has left the reactor, further sodium hydroxide solution is added to the emulsion to maintain the pH and the polycondensation catalyst is added. The reaction emulsion together with these additions is pumped through a flow tube to form a high molecular weight polycarbonate. The emulsion is then separated into its phases in a simple separating vessel. Part of the aqueous reaction phase is returned to the first stage of the reaction and the remainder is discharged to be worked up as effluent. The organic phase is washed free from electrolytes by known methods. The polycarbonate is isolated by removal of the solvents by evaporation by known methods.

The thermoplastic, aromatic polycarbonates obtainable by the process according to the invention may have weight average molecular weights Mw (determined, for example, by measuring the relative solution viscosity in $CH_2Cl_2$ at 25° C. and at a concentration of 0.5 g in 100 ml of $CH_2Cl_2$ of from 10,000 to 100,000.

They may be worked up into any mouldings or articles such as films, threads, plates, lamp housings, optical lenses or compact discs in the conventional machines.

The usual additives such as stabilizers, mould release agents, flame retardants, antistatic agents, fillers, fibres, impact strength modifiers, etc. may be added in the usual quantities for thermoplastic polycarbonates in the course of isolation of the polycarbonates obtainable according to the invention or before or while they are processed.

The thermoplastic polycarbonates obtainable according to the invention are employed in the usual technical fields for polycarbonates, for example in the electrical sector or the building industry, for light fittings and optical purposes but especially for optical discs and audiodiscs.

EXAMPLE 1

88.4 kg of bisphenolate solution/h, 3.92 kg of a 5% phenol solution in a solvent mixture of 50 parts by weight of methylene chloride and 50 parts by weight of chlorobenzene/h, 85.2 kg of a solvent mixture of 50 parts by weight of methylene chloride and 50 parts by weight of chlorobenzene/h, 7.0 kg of phosgene/h, 177 kg of aqueous reaction phase/h and 3.47 kg of 50% sodium hydroxide solution/h are pumped into a pump circulation reactor with heat exchanger. The bisphenolate solution contains 15% by weight of bisphenol A and 2 mol of sodium hydroxide per mol of bisphenol A. The BPA concentration, based on the quantity of aqueous phases introduced, is 5% by weight of bisphenol A.

The temperature is maintained at 28° C. by cooling and the average residence time is 6.9 minutes.

1.49 kg of 50% sodium hydroxide solution/h and 3.3 kg of a 2% by weight N-ethylpiperidine solution in a solvent mixture of 50 parts by weight of methylene chloride and 50 parts by weight of chlorobenzene/h are added to the reaction emulsion before its entry into a heat controllable residence reactor consisting of mixing and residence zones. The temperature is adjusted to 36° C. The average residence time is 3.0 minutes. The pH is found to be 13.3.

Spontaneous phase separation is observed after the reaction mixture leaves the reactor. The separating time of a sample in a 1 liter measuring cup is about 1 minute. The residual water content of the crude polycarbonate solution is 0.31%.

The crude polycarbonate solution is freed from catalyst by extraction with acid by known methods and washed free from electrolytes with water.

The polycarbonate is isolated through an extruder by evaporation of the solvent. Colouring agents are incorporated in the polycarbonate in the extruder to compensate for the "yellow tinge" of the polycarbonate and Tinuvin 350 (Trade Product Ciba Geigy) is similarly incorporated as UV stabilizer.

0.25% OH−, 0.83% $CO_3^{13}$, 220 ppm phenol and 90 ppm bisphenol A are found in the aqueous reaction phase.

The following data are determined on the polycarbonate: Relative viscosity 1.280, <2 ppm saponifiable chlorine, 135 ppm phenolic OH end groups, <0.5 ppm sodium, permeability to light 89.3%, 0.29% free Tinuvin 350 and 0.29% total Tinuvin 350 content (determined by UV spectroscopy). No incorporation of Tinuvin has taken place within the degree of accuracy of measurement.

EXAMPLE 2

The same arrangement of reactors is used as in Example 1. The following streams of raw material are pumped in: 66.3 kg of bisphenolate solution/h, 3.92 kg of a 5% phenol solution in a solvent mixture of 50 parts by weight of methylene chloride and 50 parts by weight of chlorobenzene/h, 85.2 kg of a solvent mixture of 50 parts by weight of methylene chloride and 50 parts by weight of chlorobenzene/h, 7.0 kg of phosgene/h, 199 kg of aqueous reaction phase/h and 3.29 kg of 50% sodium hydroxide solution/h. The bisphenolate solution contains 20% by weight of bisphenol A and 2 mol of sodium hydroxide per mol of bisphenol A. Based on the quantity of aqueous phases introduced, the BPA concentration is 5% by weight of bisphenol A.

The temperature is maintained at 28° C. by cooling and the average residence time is 7.1 minutes.

1.41 Kg of 50% sodium hydroxide solution/h and 3.3 kg of a 2% by weight N-ethylpiperidine solution in a solvent mixture of 50 parts by weight of methylene chloride and 50 parts by weight of chlorobenzene/h are added to the reaction emulsion before its entry into a heat controlled residence reactor. The temperature is adjusted to 36° C. The average residence time is 3.1 minutes. The pH is found to be 13.3.

Spontaneous phase separation is observed when the reaction mixture has left the reactor. The separating time of a sample in a 1 liter measuring cup is about 1 minute. The residual water content of the crude polycarbonate solution is 0.26%.

The phases are worked up as described in Example 1.

The aqueous reaction phase is found to contain 0.22% OH−, 0.84% $CO_3^-$, 190 ppm phenol and 65 ppm bisphenol A.

The following data were determined on the polycarbonate: Relative viscosity 1,278, 2 ppm saponifiable chlorine, 105 ppm phenolic OH end groups, <0.5 ppm sodium, permeability to light 89.5%, 0.29% free Tinuvin 350 and 0.30% total Tinuvin 350 content. No incorporation of Tinuvin has taken place within the degree of accuracy of measurement.

EXAMPLE 3

The same arrangement of reactors and the same quantities of raw material as in Example 1 are used or adjusted except that a solvent mixture of 70 parts by weight of methylene chloride and 30 parts by weight of toluene is used instead of the solvent mixture of 50 parts by weight of methylene chloride and 50 parts by weight of chlorobenzene.

The temperatures and average residence times in the reactors are virtually the same.

Working up of the product after spontaneous phase separation is carried out as in Example 1. The residual water content in the crude polycarbonate solution after phase separation is 0.22%. The separating time of a sample in a 1 liter measuring cup is about 1 minute.

The aqueous reaction phase is found to contain 0.26% OH−, 0.80% $CO_3^-$, 220 ppm phenol and 110 ppm bisphenol A. The pH is 13.4.

The following data were determined on the polycarbonate: relative viscosity 1.279, <2 ppm saponifiable chlorine, 140 ppm phenolic OH end groups, <0.5 ppm sodium, permeability to light 89.7%, 0.31% free Tinuvin 350 and 0.31% total Tinuvin 350 content. No incorporation of Tinuvin has taken place within the degree of accuracy of measurement.

EXAMPLE 4

The same arrangement of reactors and the same quantities of raw material are used or adjusted as in Example 1 except that pure methylene chloride is used instead of the solvent mixture of 50 parts by weight of methylene chloride and 50 parts by weight of chlorobenzene.

The temperatures are virtually the same. The average residence times are 7.1 minutes in the pump circulation reactor and 3.1 minutes in the residence reactor.

The crude polycarbonate solution is found to have a residual water content of 0.33% after the spontaneous phase separation. The separating time of a sample in a 1 liter measuring cup is about 1 minute.

The polycarbonate was isolated by way of an extruder as in U.S. Pat. No. 4,631,338 (Le A 22 921) by replacement of the methylene chloride by toluene followed by evaporation of the toluene in evaporation installations.

The aqueous reaction phase was found to contain 0.24% OH−, 0.82% $CO_3^-$, 235 ppm phenol and 95 ppm bisphenol A. The pH was found to be 13.1.

The following data are determined on the polycarbonate: relative viscosity 1.284, <2 ppm saponifiable chlorine, 115 ppm phenolic OH end groups, <0.5 ppm sodium, permeability to light 89.6%, 0.30% free Tinuvin 350 and 0.31% total Tinuvin 350 content. No incorporation of Tinuvin has taken place within the degree of accuracy of measurement.

EXAMPLE 5

The same arrangement of reactors and the same quantities of raw material are used or adjusted as in Example 1 except that pure chlorobenzene is used instead of the solvent mixture of 50 parts by weight of methylene chloride and 50 parts by weight of chlorobenzene. The volume of the pump circulation reactor is reduced to obtain a shorter residence time. The reaction enthalpy is not removed in order that the higher temperatures required for dissolving the polycarbonates produced in the reaction may be obtained.

The temperature in the pump circulation reactor is 69° C. and the average residence time is 2.7 minutes. The temperature in the residence reactor is adjusted to 84° C. The average residence time is 2.9 minutes.

After the spontaneous phase separation, 0.18% of residual water is found in the crude polycarbonate solution. The separating time of a sample in a 1 liter measuring cup is about 1 minute.

The polycarbonate is isolated as in Example 1.

The aqueous reaction phase is found to contain 0.23% OH−, 0.84% $CO_3^-$, 210 ppm phenol and 130 ppm bisphenol A. The pH is 13.4.

The following data are determined on the polycarbonate: Relative viscosity 1.279, <2 ppm saponifiable chlorine, 155 ppm phenolic OH end groups, <0.5 ppm sodium, permeability to light 89.7%, 0.30% free Tinuvin 350 and 0.29% total Tinuvin 350 content. No incorporation of Tinuvin has taken place within the degree of accuracy of measurement.

Comparison Example 1

The same arrangement of reactors and the same quantities of raw material are used or adjusted as in Example 1 except that no aqueous reaction phase is returned.

The temperature in the pump circulation reactor is 28° C. and the average residence time is 13.9 minutes. The temperature in the residence reactor is 36° C. and the average residence time is 6.0 minutes.

The residual water content in the crude polycarbonate solution after phase separation is 3.9%. There is virtually no reduction in this value even after the sample has been left to stand for 8 hours. The separating time of a sample in a 1 liter measuring cup is 9 minutes.

The polycarbonate is isolated as in Example 1.

0.25% $OH^-$, 0.85% $CO_3^-$, 255 ppm phenol and 235 ppm bisphenol A are found in the aqueous reaction phase. The pH is 13.3.

The following data are determined on the polycarbonate: Relative viscosity 1.277, <2 ppm saponifiable chlorine, 175 ppm phenolic OH end groups, 0.8 ppm sodium, permeability to light 88.9%, 0.18% free Tinuvin 350 and 0.31% total Tinuvin 350 content. The Tinuvin is partially (0.13%) incorporated.

Comparison Example 2

The same arrangement of reactors is used as in Example 1. The streams of raw material introduced are as follows: 88.4 kg bisphenolate solution/h, 3.92 kg of a 5% phenol solution in a solvent mixture of 50 parts by weight of methylene chloride and 50 parts by weight of chlorobenzene/h, 85.2 kg of a solvent mixture of 50 parts by weight of methylene chloride and 50 parts by weight of chlorobenzene/h, 7.0 kg of phosgene/h, 177 kg of water/h and 4.95 kg of 50% sodium hydroxide solution/h. The bisphenolate solution contains 15% by weight of bisphenol A and 2 mol of sodium hydroxide per mol of bisphenol A.

The temperature is maintained at 28° C. by cooling and the average residence time is 6.7 minutes.

2.10 kg of 50% sodium hydroxide solution/h and 3.3 kg of a 2% by weight N-ethylpiperidine solution in a solvent mixture of 50 parts by weight of methylene chloride and 50 parts by weight of chlorobenzene/h are added to the reaction emulsion before its entry into a residence reactor. The temperature is adjusted to 36° C. and the average residence time is 2.9 minutes.

Spontaneous phase separation is observed after the reaction product leaves the reactor. The separating time of a sample in a 1 liter measuring cup is less than 30 seconds. The residual water content in the crude polycarbonate solution is 0.39%.

0.22% $OH^-$, 0.27% $CO_3^-$, 260 ppm phenol and 470 ppm bisphenol A are found in the aqueous reaction phase. The pH is found to be 13.2.

The following data are determined on the polycarbonate: Relative viscosity 1.343, <2 ppm saponifiable chlorine, 285 ppm phenolic OH end groups, <0.5 ppm sodium, permeability to light 89.1%, 0.29% free Tinuvin 350 and 0.29% total Tinuvin 350 content. No incorporation of Tinuvin has taken place within the degree of accuracy of measurement.

The higher relative viscosity indicates reduced utilisation of the chain terminator.

What is claimed is:

1. In the process for the preparation of thermoplastic, aromatic polycarbonates by the method of phase interface condensation from phosgene, at least one diphenol, at least one chain terminator and optional branching agents by the phosgenation of an aqueous alkali metal salt solution of said diphenol at pH values of from 8 to 14 in the presence of at least one solvent and at least one polycondensation catalyst the improvement comprising
    (i) carrying out the process in two reactors arranged in sequence wherein phosgenation is carried out in a first reactor and the polycondensation is carried out in a second reactor, and
    (ii) returning to said first reactor a proportion of the aqueous reaction phase obtained after completion of said polycondensation,
said proportion along with additional raw materials being in an amount sufficient to cause the direct formation and maintenance of an oil-in-water emulsion throughout the process, said solvent being immiscible in water and being a solvent of aromatic oligocarbonates and aromatic polycarbonates and wherein said diphenol is present in said aqueous alkali metal salt solution at a concentration of about 10 to 40% relative to the weight of said solution, and wherein said proportion is first cooled to such a temperature and used in such a quantity that the boiling point of said solvent at atmospheric pressure is not reached in either of the reactors, even without further cooling.

2. The process of claim 1 wherein said first reactor the aqueous alkali metal salt solution of the diphenols together with added monophenols is reacted with phosgene in the presence of said solvent to produce an intermediate product and the returned proportion contains aqueous reaction phase and additional alkali metal liquor which is introduced into said first reactor with time delay, and in the second reactor said intermediate product is condensed to polycarbonate in the presence of a polycondensation catalyst.

3. The process of claim 1 wherein said proportion is in an amount such that the concentration of the diphenol, based on the weight of the aqueous phase is about 2.5 to 15%.

4. The process of claim 1 wherein solvent has a boiling point which is higher than the prevailing reaction temperature.

5. The process of claim 1 wherein a residence time of 10 seconds to 30 minutes prevail in said first reactor and a residence time of 1 minute to 30 minutes prevails in said second reactor.

6. The process of claim 1 wherein said first and said second reactors are flow tubes.

7. The process of claim 1 wherein said first reactor is a pump circulation reactor and said second reactor is a flow tube reactor.

* * * * *